United States Patent
Carrie et al.

(10) Patent No.: US 10,642,709 B2
(45) Date of Patent: May 5, 2020

(54) PROCESSOR CACHE TRACING

(75) Inventors: Susan Carrie, Mountain View, WA (US); Vijay Balakrishnan, Mountain View, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1878 days.

(21) Appl. No.: 13/090,132

(22) Filed: Apr. 19, 2011

(65) Prior Publication Data
US 2012/0272011 A1 Oct. 25, 2012

(51) Int. Cl.
G06F 11/34 (2006.01)
G06F 12/0802 (2016.01)

(52) U.S. Cl.
CPC ...... G06F 11/3466 (2013.01); *G06F 12/0802* (2013.01); *G06F 2201/885* (2013.01)

(58) Field of Classification Search
None
See application file for complete search history.

(56) References Cited

U.S. PATENT DOCUMENTS

| | | | |
|---|---|---|---|
| 5,680,572 A | 10/1997 | Akkary et al. | |
| 5,893,150 A | 4/1999 | Hagersten et al. | |
| 6,134,643 A | 10/2000 | Kedem et al. | |
| 6,138,212 A | 10/2000 | Chiacchia et al. | |
| 6,314,431 B1 | 11/2001 | Gornish | |
| 6,339,813 B1 | 1/2002 | Smith, III et al. | |
| 6,526,535 B1 * | 2/2003 | Warren | G01R 31/318552 714/727 |
| 7,197,680 B2 * | 3/2007 | Kimelman | G01R 31/318572 714/724 |
| 8,370,609 B1 * | 2/2013 | Favor | G06F 9/3808 712/225 |
| 8,473,724 B1 * | 6/2013 | Kenville | G06F 9/30076 712/229 |
| 2008/0235549 A1 * | 9/2008 | Yamada | 714/738 |
| 2009/0089626 A1 * | 4/2009 | Gotch et al. | 714/45 |
| 2009/0187790 A1 * | 7/2009 | Williams et al. | 714/37 |
| 2009/0198910 A1 | 8/2009 | Arimilli et al. | |
| 2011/0029823 A1 * | 2/2011 | Horley et al. | 714/45 |

OTHER PUBLICATIONS

Iyer, Ravi, "On modeling and analyzing cache hierarchies using Casper", Retrieved at << http://ieeexplore.ieee.org/stamp/stamp.jsp?tp=&arnumber=1240655&userType=inst >>, Proceedings of the 11TH IEEE/ACM International Symposium on Modeling, Analysis and Simulation of Computer Telecommunications Systems, 2003, pp. 7.

* cited by examiner

*Primary Examiner* — Charles Rones
*Assistant Examiner* — Ryan Dare
(74) *Attorney, Agent, or Firm* — Alleman Hall Creasman & Tuttle LLP

(57) ABSTRACT

A method for refining multithread software executed on a processor chip of a computer system. The envisaged processor chip has at least one processor core and a memory cache coupled to the processor core and configured to cache at least some data read from memory. The method includes, in logic distinct from the processor core and coupled to the memory cache, observing a sequence of operations of the memory cache and encoding a sequenced data stream that traces the sequence of operations observed.

18 Claims, 5 Drawing Sheets

| | CACHE-LINE ADDRESS | SET INDEX | WAY INDEX | REQUESTOR ID | TIME STAMP |
|---|---|---|---|---|---|
| REPLACEMENT | INCLUDE | OMIT | INCLUDE | INCLUDE | INCLUDE |
| READ | OMIT | INCLUDE | INCLUDE | INCLUDE | INCLUDE |
| WRITE | OMIT | INCLUDE | INCLUDE | INCLUDE | INCLUDE |
| EVICTION | OMIT | INCLUDE | INCLUDE | INCLUDE | INCLUDE |
| IO SNOOP | OMIT | INLCUDE | INCLUDE | INCLUDE | INCLUDE |

FIG. 4

PROCESSOR CACHE TRACING

BACKGROUND

A modern computer system may include one or more processor chips—a central processing unit (CPU) and/or graphics processing unit (GPU), for example. Each of the processor chips may include one or more processor cores configured to exchange data with system memory via a system bus. To enable faster exchange of data with the system memory, a processor chip may also include one or more memory caches—arrays of fast memory directly addressable by the processor cores. Before requesting data from the system memory, a processor core may first determine whether the requested data can be found in the memory cache. If not, a copy of that data may be written to the memory cache, so that subsequent requests for the same data may be served faster. If the data in the memory cache is altered, the altered data can be written back to the system memory at the appropriate address. In this manner, the various processor cores may access data in the system memory in a virtualized manner, which may be faster than repeated access to the same data over the system bus.

Directly or indirectly, operating-system and/or application software of a computer system may influence memory-cache operations. As a result, the extent to which the memory cache improves processor-chip performance may be enhanced or degraded based on the manner in which the software is programmed.

SUMMARY

One embodiment of this disclosure provides a method for refining multithread software executed on a processor chip of a computer system. The envisaged processor chip has at least one processor core and a memory cache coupled to the processor core and configured to cache at least some data read from memory. The method includes, in logic distinct from the processor core and coupled to the memory cache, observing a sequence of operations of the memory cache and encoding a sequenced data stream that traces the sequence of operations observed.

The summary above is provided to introduce a selected part of this disclosure in simplified form, not to identify key or essential features. The claimed subject matter, defined by the claims, is limited neither to the content of this summary nor to implementations that address problems or disadvantages noted herein.

BRIEF DESCRIPTION OF THE DRAWINGS

FIG. 4 summarizes parameters that may be encoded in a sequenced data stream for different memory-cache operations, in accordance with an embodiment of this disclosure.

DETAILED DESCRIPTION

Figure 1:
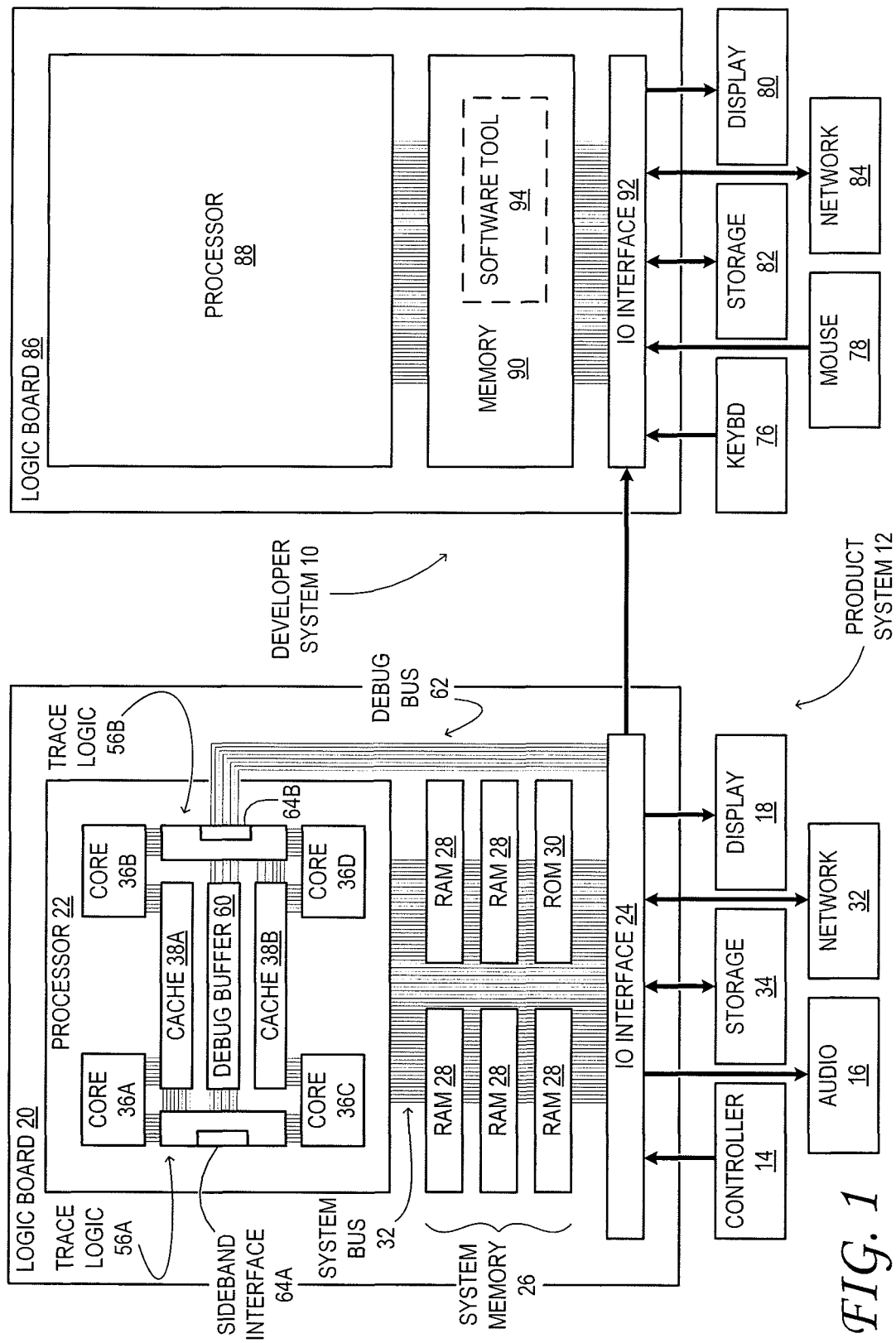
FIG. 1 shows aspects of two example computer systems, a developer system and a product system, in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of two example computer systems: developer system 10 and product system 12. In one embodiment, the product system may be a game system—e.g., a modern, interactive, graphics- and processing-intensive video game system. Accordingly, product system 12 includes game controllers 14, audio amplifier 16, and display 18. The display may be a large-format, flat-screen display, or a stereoscopic headset, for example. In other embodiments, the product system may include additional or alternative input componentry, such as a vision system that detects a player's movements and gestures. In other embodiments, the product system may be a personal computer (PC) configured for other uses in addition to gaming. In still other embodiments, the product system may be entirely unrelated to gaming; it may be furnished with input and output componentry appropriate for its intended use.

Product system 12 includes logic board 20. Mounted to the logic board are processor chip 22, input-output (IO) interface 24, and system memory 26, which includes random-access memory (RAM) 28, and read-only memory (ROM) 30. The processor chip, IO interface, and system memory are linked by system bus 32, over which these and other components exchange data. The term 'data' is generic as used herein; it embraces digital information of any kind, including any form of machine-readable instruction code. As shown in FIG. 1, the IO interface is operatively coupled, directly or through additional, off-board logic, to the input and output components noted above, to network 32, and to data-storage medium 34.

In the illustrated embodiment, processor chip 22 is the sole, central processing unit (CPU) of product system 12. In other embodiments, it may be a graphics processing unit (GPU) dedicated primarily to rendering graphics on display 18, or one of several CPUs or GPUs of the product system. In the embodiment shown in FIG. 1, the processor chip includes four discrete processor cores 36A through 36D. Each processor core is configured to read data from system memory 26, and to write data to system memory 26. Processor chip 22 also includes memory caches 38A and 38B. Each memory cache is coupled to two of the four processor cores and configured to cache at least some of the data read from the system memory. In some embodiments, one or more of the memory caches on the processor chip may be further configured to cache at least some of the data written to the system memory. Accordingly, this disclosure embraces numerous memory-cache variants: read-only instruction caches, read-write data caches, and translation look-aside buffers (TLBs), as non-limiting examples.

FIG. 1 illustrates one example mapping of four processor cores to two memory caches, but other mappings are contemplated as well. More generally, a single processor core may be operatively coupled to a plurality of memory caches; a single memory cache may be operatively coupled to a plurality of processor cores; or each of a plurality of processor cores may be operatively coupled to one and only one memory cache.

Figure 2:
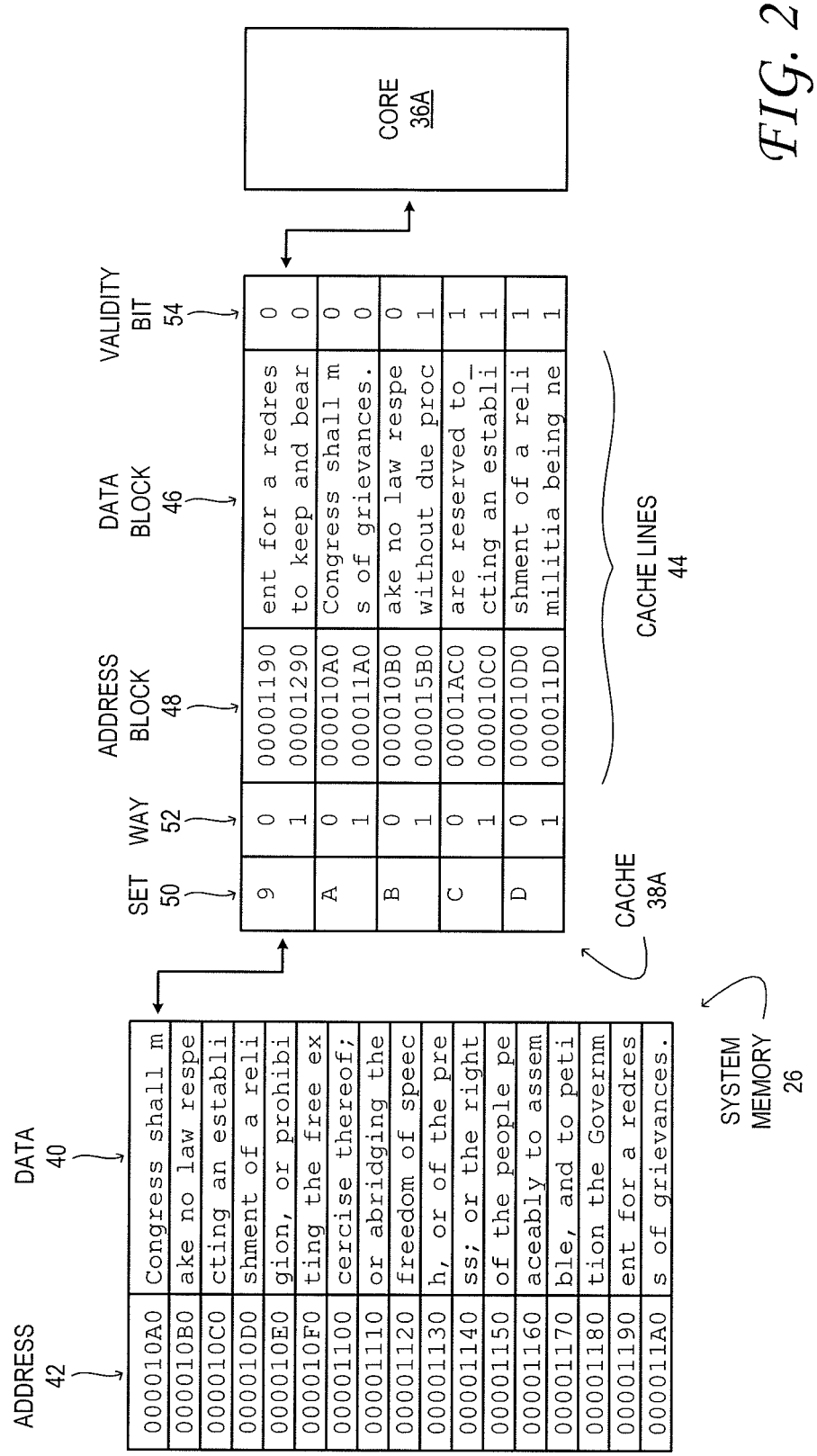
FIG. 2 shows aspects of an example system memory, processor core, and memory cache, in accordance with an embodiment of this disclosure.

FIG. 2 shows additional aspects of system memory 26, processor core 36A, and memory cache 38A in one embodiment. In the illustrated scenario, the system memory contains data 40, represented by example as a sequence of 8-bit characters. Each datum stored in the system memory is addressable at a different physical memory address 42. For ease of illustration, the system memory in FIG. 2 is blocked off into 128-bit blocks; each block is addressable at the memory byte address shown to its left.

Memory cache 38A includes a series of cache lines 44. In the illustrated embodiment, each cache line includes a 128-bit data block 46 associated with a corresponding address block 48. The address block stores the system-memory address corresponding to the appended data block. In the illustrated embodiment, each cache line is indexed by a set index 50 and a way index 52, and is associated with a validity bit 54, as further described below.

When processor core 36A or 36B attempts to read data from, or write data to, a specified address in system memory 26, memory-cache logic first checks whether the contents of that address are already available in memory cache 38A. A 'cache hit' is said to have occurred if the contents are available. In that case, the processor core reads from or writes to the cache line mapped to the specified address. However, if the contents of the specified address are not available in the memory cache, then a 'cache miss' has occurred. In that case, an existing cache line is evicted (i.e., cast out) and replaced by a new cache line, comprising the data block retrieved from the specified address of the system memory.

The rule that identifies which entry to evict is called the 'replacement policy'. One example replacement policy selects the least recently used (LRU) entry. In embodiments in which a processor core writes to as well as reads from memory cache 38A, a 'write policy' determines when the system memory is updated to reflect changes in the memory cache. For example, a 'write-through' policy ensures that the system memory is updated every time the cache is altered. By contrast, a 'write-back' policy tracks the locations in the memory cache that have been altered—by clearing validity bit 54, for example—and writes the altered data back to the system memory when such data is evicted from the memory cache.

In a so-called 'associative' memory cache, a given data block from the system memory may be written to any one of a plurality of different cache lines. In the example illustrated in FIG. 2, memory cache 38A is a 'two-way' cache: data from each memory address may be written to one of two different cache lines. In other embodiments, the number of possible cache lines for each memory address may be greater or fewer than two. Associative memory caching reduces the likelihood that a given cache line will be evicted before it is needed again. In such embodiments, the set index specifies which plurality (i.e., 'set') of cache lines a given data block is mapped to; the way index specifies which particular line (i.e., 'way') the data block is mapped to. The write policy may determine the set index based on a series of least-significant bits of the system-memory address of the data to be cached, while the way index is determined based on the validity of the data already present in the various ways of the set. When an attempt is made to read a data block from the memory cache, all address blocks in the set are read and compared to that of the desired data block. The matching address block, if any is found, identifies the way from which the desired data may be retrieved.

Returning now to FIG. 1, RAM 28 may receive—from network 32 or data storage medium 34, for example—software instructions and other data that enable it to execute at least a portion of a video game or other application. Such software instructions may include OS software, application software, or both. In some embodiments, the software instructions may include a plurality of instruction threads to be executed concurrently by processor chip 22.

During execution, one or more instruction threads may cause processor core 36A or 36B to access system memory 26 through memory cache 38A. However, the memory cache may effect a less-than-optimal performance enhancement if such execution cause frequent cache misses, in turn causing frequent cache-line replacements and access to system memory 26 over bus 32. In some scenarios, the same data may be subject to repeated eviction and replacement. This phenomenon, referred to as 'thrashing', may significantly degrade performance.

Thrashing may occur in at least two different scenarios. First, the same set may be overused because too many data structures in active threads map into it. The cache lines in the set may be subject to frequent eviction to make room for data just fetched. Second, two or more processor cores may share the same location in memory which corresponds to a specific line in a cache; the processor cores may cause the data to be transferred between their private caches repeatedly. In this case, the processor cores may actually share a piece of the data, or, two or more data structures may have inadvertently been mapped to the same location in memory which corresponds to a specific cache line by a compiler or other software tool.

To reduce the incidence of thrashing and the frequency of cache misses in processor chip 22, at least one instruction thread executed by the processor chip may be programmed to at least partially avoid the scenarios identified above. A programming approach that judiciously influences the placement of data in system memory may be effective in reducing the incidence of thrashing and the frequency of cache misses. However, such an approach relies on the developer's ability to pinpoint which parts of the executing instruction threads are at fault.

Some tools presently available may aid the developer in locating faulty code segments. Such tools include performance counters, statistical sampling, instruction tracing, and instruction-behavior sampling (IBS), as examples. However, these tools may be inadequate for multicore processor chips, because they do not track memory-cache activity in sufficient detail. In a multicore processor, the actions of one processor core can interfere with the memory-caching done by another processor. For example, data written to a cache line in memory cache 38A by processor core 36A may be evicted due to access of the same memory cache by processor core 36B. If the two cores are accessing different data within the same cache line, then that line may be moved back and forth between the cores, lowering performance. Locating and identifying multicore usage patterns may be difficult or impossible using the tools noted above.

By contrast, the present disclosure identifies a low-overhead approach to tracing memory-cache activity, which is fully applicable to multi-core processor chips. Aided by this technology, the developer can more easily identify memory-cache usage patterns that degrade performance. Accordingly, FIG. 1 shows cache-trace logic 56A coupled to memory cache 38A, and cache-trace logic 56B coupled to memory cache 38B. In one embodiment, the cache-trace logic is fabricated on processor chip 22 in close proximity to the memory cache to which it is coupled. Distinct from the various processor cores of processor chip 22, the cache-trace logic is configured to non-intrusively observe a sequence of operations of at least one memory cache. The cache-trace logic is also configured to encode a sequenced data stream that traces the sequence of operations observed. As described in further detail below, the observed sequence of operations may include cache-line replacements, cache-line reads, cache-line writes, evictions not associated with the writing of a new cache line, and IO snooping of a cache-line, for example.

In some embodiments, cache-trace logic 56A or 56B may also be configured to receive certain metadata reflecting a state or condition of processor chip 22, such metadata being offered by, or furnished at the request of, a suitably configured OS or application. The metadata may include a time or program-counter stamp corresponding to a just-performed or soon-to-be-performed memory-cache operation, or an identifier of the instruction thread requesting the memory-cache operation. In these embodiments, the cache-trace logic may synchronously incorporate such metadata in the sequenced data stream, so that it appears in the relevant context for ease of analysis.

In some embodiments, cache-trace logic 56A or 56B may also be configured to store the sequenced data stream. The sequenced data stream may be stored in debug buffer 60, in system memory 26, or in other, dedicated memory. In these and other embodiments, the cache-trace logic may be configured to send the sequenced data stream to an external capture device, such as developer system 10. The sequenced data stream may be sent via debug bus 62, system bus 32, or any other suitable componentry.

To send out the sequenced data stream, cache-trace logic 56A includes sideband interface 64A. The sideband interface is configured to support a cache-trace analysis software tool executed on an external device. As described in further detail below, the cache-trace analysis software tool may be configured to relate the observed memory-cache operations and/or metadata to corresponding code regions of the instruction threads executed on processor chip 22. In one embodiment, the sideband interface may be configured to update physical-to-virtual address mappings of the executing instruction threads, so that the encoded cache-line addresses can be associated with code data structures of the instruction threads. In another embodiment, the sideband interface may be configured to trace memory allocations of virtual address space so that virtual addresses can be associated with the code data structures. In another embodiment, the sideband interface may be configured to update the mapping of the various executing instruction threads onto the specific processor cores which execute them.

The configurations described above are not intended to be limiting in any sense. In the embodiment shown in FIG. 1, each instance of the cache-trace logic (cache-trace logic 56A and 56B) is associated with two different processor cores. In other embodiments equally contemplated, each instance of the cache-trace logic may be operatively coupled through its associated memory cache to exactly one processor core. In still other embodiments, multiple instances of cache-trace logic may be coupled through an associated memory cache to one processor core.

The configurations described above enable various methods for refining software. Accordingly, some such methods are now described, by way of example, with continued reference to the above configurations. It will be understood, however, that the methods here described, and others fully within the scope of this disclosure, may be enabled by other configurations as well. Naturally, each execution of a method may change entry conditions for subsequent execution and thereby invoke a more complex methodology. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 3:
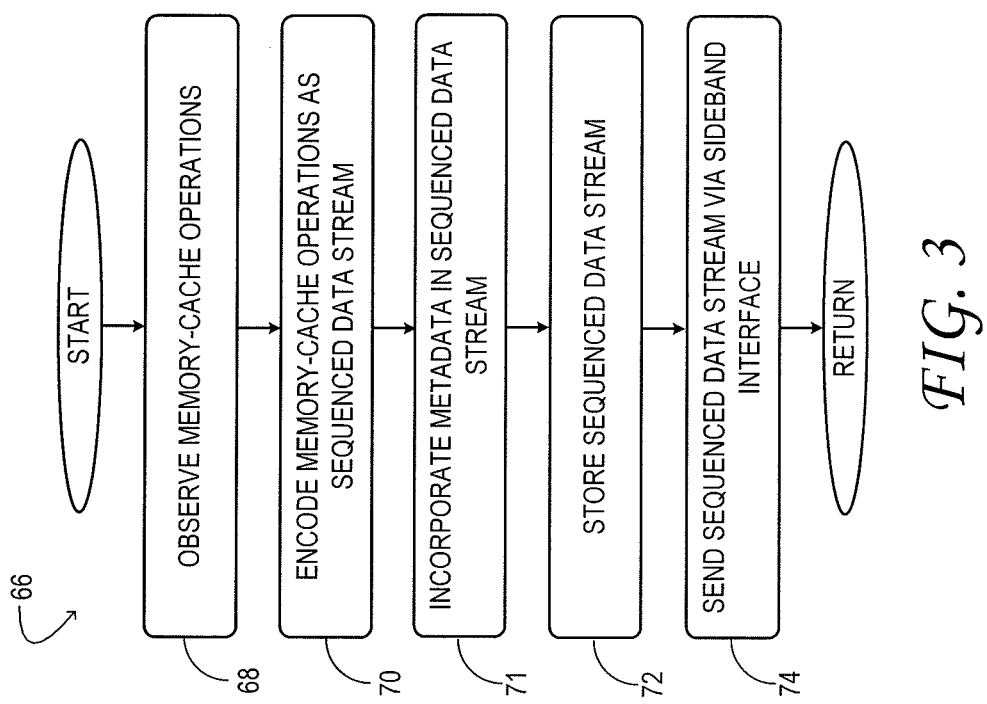
FIG. 3 illustrates an example method for refining multithread software executed on a processor chip of a computer system, in accordance with an embodiment of this disclosure.

FIG. 3 illustrates an example method 66 for refining multithread software by identifying memory-cache performance issues executed on a processor chip of a computer system.

At 68 of method 66, a sequence of operations of the memory cache is observed in cache-trace logic distinct from the one or more processor cores of a processor chip. As noted above, the sequence of operations observed at 68 may include cache-line replacements, cache-line reads, cache-line writes, evictions not associated with the writing of a new cache line, and IO snooping of a cache-line, for example. In one embodiment, a sequence of operations of the memory cache may be observed and then filtered according to suitable criteria. For example, the cache-trace logic may be configured to observe all operations of an associated memory cache, but to pass only a filtered subset of observed operations for further processing. Thus, the 'observed operations', as referred to hereinafter, may be a filtered sequence of operations derived from an unfiltered sequence of operations also observed in the logic. To conserve bandwidth, the cache-trace logic may be configured to pass over and not trace the observed operations of the unfiltered sequence that are excluded from the filtered sequence. In one particular embodiment, the filtered sequence may include only those operations that result from a cache miss.

At 70, the cache-trace logic encodes a sequenced data stream that traces the sequence of operations observed. The sequenced data stream is encoded in a form suitable for storage and/or transmission to an external device. The type and amount of data included in the sequenced data stream may differ from one embodiment to the next, and based on the memory-cache operations observed. In one embodiment, the sequenced data stream may encode the full memory address corresponding to the cache line affected by an operation. In other embodiments, the sequenced data stream may include the set index and way index for each operation observed, but may omit the remainder of the memory address.

At 71, metadata offered to the cache-trace logic by a suitably configured OS or application thread is received and synchronously incorporated into the sequenced data stream. Such metadata may reflect a state or condition of the processor chip; it may include out-of-band information from the processor chip regarding memory allocation and threads being executed. Such metadata may be used to identify which aspects (e.g., data structures, code modules, etc.) of the one or more threads cause excessive misses or thrashing in the memory cache. In one example, the metadata may include a time stamp reflecting an execution time of an operation in the sequence of operations observed, or an analogous program-counter stamp. In this and other examples, the metadata may include a physical-to-virtual memory mapping effective at the time of the operation.

In embodiments fully consistent with this disclosure, metadata as described above may be synchronously incorporated, more generally, into any data stream that tracks and/or reports performance of the processor chip or computer system. Suitable data streams distinct from the sequenced data stream encoded in the cache-trace logic, may include data from a diagnostic/debugging module of the OS or application, or from diagnostic/debugging hardware, for example.

In the various embodiments considered herein, the particular actions taken at 70 and 71 may differ based on the different operations observed at 68. In one embodiment, the sequence of operations observed at 68 may include a cache-line replacement. In a cache-line replacement, an existing cache line is replaced by a new one. This operation may result in an eviction or cache-line invalidation (if the data being replaced was valid); it may itself be caused by a cache-line write, cache-line read, cache-line pre-fetch, or other operation. In one example, the set index for each cache-line replacement may be determined from the memory address of the replacement cache line. In some embodiments, it may be advantageous to trace the virtual address of the replacement block rather than just the set and way—In one embodiment, the entire virtual address minus $\log_2$ of the cache-line size may be traced.

In some embodiments, cache-line replacement itself may trigger the encoding of the sequenced data stream. Accordingly, the method may be agnostic to the detailed replacement policy and associated corner cases. Further, because cache misses are relatively rare (e.g., occurring in only a few percent of the executed instructions), the bandwidth required in this example to encode the observed sequence of operations is not excessive.

In this and other embodiments, the metadata received and synchronously incorporated at 71 may identify the requestor that has requested the cache-line replacement. Likely requestors could include a hardware thread of processor chip 22, any of a plurality of instruction threads being executed, or a GPU compute unit, as examples. Further, the sequenced data stream encoded at 70 may also identify the cause of the cache-line replacement. For example, the trace may identify whether the cache line was evicted to accommodate the current write. If so, then the address of the evicted line can be determined from prior trace history—i.e., from an antecedent datum in the sequenced data stream. In one embodiment, the set and way indices of a cache line may be used to identify the cache line based on prior trace history.

In another embodiment, the sequence of operations observed at 68 may include a cache-line read or a cache-line write. In some scenarios, these operations may trigger a cache-line replacement, and may be therefore be traced indirectly, in the manner described above. In other scenarios, the cache-line read or cache-line write may not trigger a replacement, and may therefore be traced separately.

When a cache line is read or written to, the address block and way index of the cache line may be observed and encoded. Alternatively, the address may be derived from the cache trace history, the set index and the way index. Tracing cache-line reads and writes may be particularly useful in embodiments in which the requestor of the operation is synchronously incorporated in the sequenced data stream. Although cache-line read and write operations occur more frequently than cache-line replacements, they require less bandwidth per operation to encode, because only the set and way indices are required. Accordingly, all such requests may be traced if adequate bandwidth is available. Moreover, the required bandwidth may be reduced by encoding only those requests that result in a hit. In one particular embodiment, cache-line read and write operations may be traced to the exclusion of the other operations discussed herein.

In another embodiment, the sequence of operations observed at 68 may include a cache-line pre-fetch. In some scenarios, this operation may trigger a cache-line replacement, and may therefore be traced indirectly, in the manner described above. In other scenarios, the cache-line pre-fetch may not trigger a cache-line replacement, and may therefore be traced separately.

For each cache-line pre-fetch, the requestor may be synchronously incorporated into the sequenced data stream. In addition, the encoded data stream may reveal whether the pre-fetch resulted in a hit or a miss. Further, the encoded sequenced data stream may reveal whether the pre-fetch was ignored on a miss. Approaches such as these may reduce bandwidth by reducing the length of the sequenced data stream.

In another embodiment, the sequence of operations observed at 68 may include a cache-line eviction. In some scenarios, a cache line may be evicted from one memory cache (e.g., memory cache 38A) because it is moved into another memory cache (e.g., memory cache 38B), or because it is flushed to the system memory. In some scenarios, the eviction may not be caused by a read or write, so it may evade detection in the embodiments described hereinabove. Accordingly, such cache-line evictions may be traced separately.

In another embodiment, the sequence of operations observed at 68 and encoded at 70 may include a cache-line IO snoop. As described above for cache-line read and write tracing, the memory address may be derived from the cache trace history, the set index, and the way index. Further, the sequenced data stream may reveal whether the cache-line is actually evicted as a result of the snoop.

FIG. 4 summarizes parameters that may be included in the sequenced data stream for certain observed cache-line operations, in one embodiment. As shown in the table, the sequence of operations may include, for each operation in the sequence, identifying which of the plurality of instruction threads has requested the operation (viz., requestor ID in FIG. 4). It may also include encoding one or more of a set index of a cache line affected by the operation, a way index of a cache line affected by the operation, and a time stamp reflecting an execution time of the operation, or an analogous program-counter stamp. In other embodiments, encoding the sequence of operations at 70 may include encoding one or more of a memory address of a cache line affected by the operation, and a usage of the cache line affected by the operation. Here, the memory address may be a physical address of the system memory, or, a virtual address mapped to the physical address of the system memory by an OS thread. The usage of the cache line may be represented in any suitable manner.

Returning now to FIG. 3, at 72 of method 66 the sequenced data stream is stored. In one embodiment, such data may be stored in a debug buffer of the processor chip. In another embodiment, where additional local storage is desired, and where performance loss is tolerable during software refining, the sequenced data stream may be stored in the system memory.

At 74 the sequenced data stream is sent to an external device via a sideband interface of the cache-trace logic. In this manner, a virtually unlimited sequenced data stream may be stored for subsequent processing, with virtually no effect on the performance of the product system. In one embodiment, the sideband interface may include a relatively low-capacity buffer to reconcile the rates of sequenced data streaming from the cache-trace logic and data uptake by the external device. In still other embodiments, on- or off-chip cache-trace storage may occur in combination with streaming to an external device.

Referring again to FIG. 1, developer system 10 may be the external device to which the sequenced data stream is sent out. The developer system may comprise a mainframe terminal, workstation, desktop, or laptop computer, for example. As such, the developer system may include suitable input, output, storage, and communications componentry. In the illustrated embodiment, such componentry includes keyboard 76, mouse 78, display 80, data-storage medium 82, and network 84. The developer system also includes logic board 86, which supports processor 88, memory 90, and IO interface 92.

Developer system 10 may be configured to execute cache-trace analysis software tool 94. The cache-trace analysis software tool is a software development tool that receives and parses the sequenced data stream from cache-trace logic 56A or 56B, so that it can be interpreted and used by a developer, as described hereinafter with reference to FIG. 5.

Figure 5:
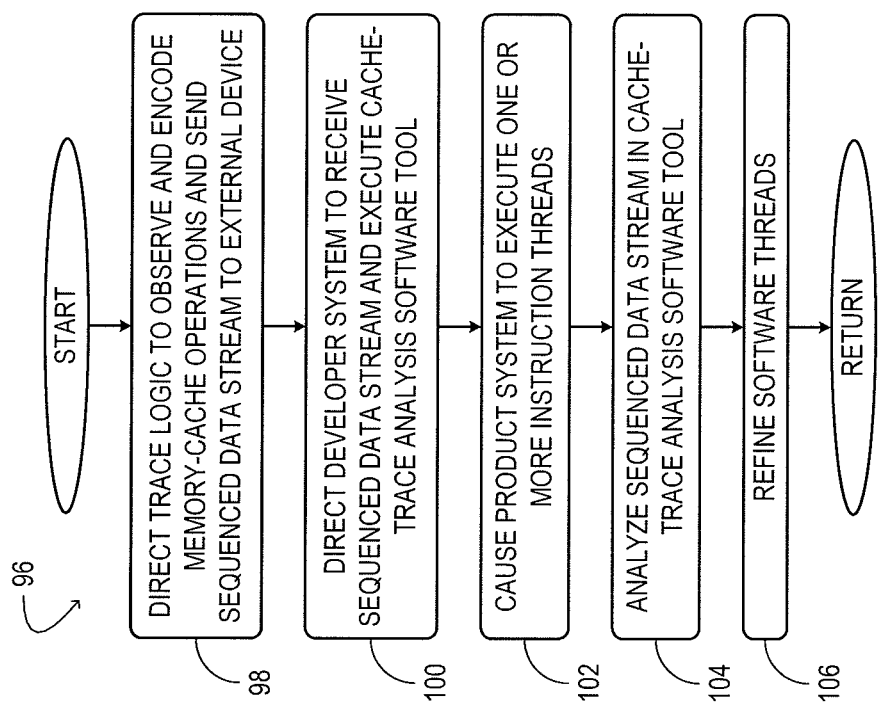
FIG. 5 illustrates another example method for refining multithread software executed on a processor chip of a computer system, in accordance with an embodiment of this disclosure.

FIG. 5 illustrates another example method 96 for refining cache performance of multithread software executed on a processor chip of a computer system, the processor chip having one or more processor cores and a memory cache coupled to the one or more processor cores. In one embodiment, methods 66 and 96 may be used concurrently.

At 98 of method 96, the cache-trace logic of the product system is directed to observe and encode memory-cache operations on a processor chip and to send the resulting sequenced data stream to an external device. A developer may so direct the cache-trace logic by raising a suitable hardware or software interrupt on logic board 20, or in any other suitable manner.

At 100 a developer system is directed to receive the sequenced data stream and to execute a cache-trace analysis software tool. The developer may so direct the developer system by installing a cable or other communications like between the product system and the developer system and running the cache-trace analysis software tool. In one embodiment, the sequenced data stream may be received through a shared input-output interface of the developer system.

At 102 the product system is caused to execute one or more instruction threads, such as the instruction threads of an OS and/or application. In one embodiment, the instruction threads may be those of a video-game application. The product system may be made to execute the instruction threads by running the game or other application.

At 104 the sequenced data stream received in the developer system is analyzed in the cache-trace analysis software tool to correlate the various memory-cache operations discussed above with the responsible code segments of the executed instruction threads. The code segments identified may be those that make ineffective use of the memory cache—e.g., by causing excessive of cache-line replacement.

At 106 an instruction thread that was executed on the product system is refined by the developer, based on information from the cache-trace analysis software tool, pursuant to the analysis of the sequenced data stream enacted at 104. In one scenario, a developer may break up an overly complex data structure to change its mapping to physical memory. In another scenario, the developer may change the sizes of suspect data structures to prevent parts of different structures from mapping to the same cache line. It yet another scenario, the developer may change the order in which the suspect data structures are declared or invoked to prevent them from colliding on the same cache line. In yet another scenario, even the replacement and/or write policies of the memory caches may be modified in view of the analysis to improve performance. In this manner, the performance enhancement afforded the product system by the various memory caches therein may be improved.

As noted above, aspects of the methods and functions described herein may be enacted via computer systems 10 and 12, shown schematically in FIG. 1. Through operative coupling of the processing and data-holding subsystems therein, these computer systems may be configured to enact the disclosed methods. Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A processor chip for a computer system, the processor chip configured to concurrently execute a plurality of instruction threads, the processor chip comprising:
    a processor core configured to read data from a memory of the computer system;
    a memory cache coupled to the processor core and configured to cache at least some of the data read from the memory; and
    diagnostic logic fabricated on the processor chip, distinct from the processor core, coupled to the memory cache, and configured to observe a sequence of operations of the memory cache and encode a sequenced data stream to enable subsequent analysis of the sequence of operations observed,
    wherein the sequence of operations observed includes one or more of a cache-line replacement, a cache-line read, a cache-line write, a cache-line eviction, and a cache-line snoop.

2. The processor chip of claim 1 wherein the processor core is one of a plurality of processor cores coupled to the memory cache and configured to read data from the memory, or to write data to the memory.

3. The processor chip of claim 1 wherein the diagnostic logic is further configured to synchronously incorporate into the sequenced data stream, for at least one operation in the sequence of operations observed, information identifying which of the plurality of instruction threads has requested the operation, a time stamp identifying an execution time of the operation, and/or a physical-to-virtual memory mapping effective at the execution time of the operation.

4. The processor chip of claim 1 wherein encoding the sequenced data stream identifies, for each operation observed, a set and/or way index of a cache line affected by the operation.

5. The processor chip of claim 1 wherein the sequenced data stream identifies, for at least one operation in the sequence of operations observed, a memory address of a cache line affected by the operation, and a usage of the cache line affected by the operation.

6. The processor chip of claim 5 wherein the memory address is one of a physical address of the memory and a virtual address mapped to the physical address by an operating system of the computer system.

7. The processor chip of claim 1 wherein the diagnostic logic includes a sideband interface configured to support a cache-trace analysis software tool, and wherein the cache-trace analysis software tool is configured to relate the sequenced data stream to corresponding code regions of the plurality of instruction threads.

8. A method for refining multithread software executed on a processor chip of a computer system, the processor chip having a processor core and a memory cache coupled to the processor core and configured to cache at least some data read from a memory of the computer system, the method comprising:
  in diagnostic logic fabricated on the processor chip, distinct from the processor core, and coupled to the memory cache, observing a sequence of operations of the memory cache, including one or more cache-line replacement operations, cache-line read operations, cache-line write operations, cache-line eviction operations, or cache-line snoop operations;
  in the diagnostic logic fabricated on the processor chip, distinct from any processor core, and coupled to the memory cache, encoding a sequenced data stream that traces the sequence of operations observed, wherein the sequenced data stream is made available to a cache-trace analysis software tool, to enable subsequent analysis of the sequence of operations observed; and
  synchronously incorporating, in diagnostic data that tracks performance of the processor chip, metadata reflecting a state of the processor chip, wherein the diagnostic data is provided by the processor chip or by an operating-system or application thread running on the processor chip.

9. The method of claim 8 wherein the sequence of operations observed is a filtered sequence of operations derived from an unfiltered sequence of operations also observed in the diagnostic logic, and wherein the sequenced data stream does not trace the observed operations of the unfiltered sequence excluded from the filtered sequence.

10. The method of claim 8 wherein the sequenced data stream includes, for each operation observed, a set index of a cache line affected by the operation, a way index of the cache line affected by the operation, and/or a memory address corresponding to the cache line affected by the operation.

11. The method of claim 8 further comprising storing the sequenced data stream in a debug buffer of the processor chip and/or storing the sequenced data stream in the memory of the computer system.

12. The method of claim 8 further comprising sending the sequenced data stream from the processor chip to an external device.

13. The method of claim 8 wherein the sequenced data stream includes, for each operation observed, a set index and a way index of a cache line affected by the operation without a remainder of a memory address corresponding to the cache line.

14. The method of claim 8 wherein the metadata includes, for at least one operation in the sequence of operations observed, information identifying which thread has requested the operation, a time stamp identifying an execution time of the operation, and/or a physical-to-virtual memory mapping effective at the execution time of the operation.

15. The method of claim 8, wherein the diagnostic data includes the sequenced data stream encoded.

16. A method for refining multithread software executed on a processor chip of a computer system, the processor chip having one or more processor cores and a memory cache coupled to the one or more processor cores, the method comprising:
  causing the one or more processor cores to execute a plurality of instruction threads;
  receiving from the computer system a sequenced data stream tracing a sequence of observed operations of the memory cache during execution of the plurality of instruction threads, the sequenced data stream encoded in diagnostic logic fabricated on the processor chip, distinct from the one or more processor cores, and coupled to the memory cache, wherein the sequence of operations includes one or more cache-line replacement operations, cache-line read operations, cache-line write operations, cache-line eviction operations, or cache-line snoop operations, and wherein the sequenced data stream is made available to a cache-trace analysis software tool;
  synchronously incorporating, in diagnostic data that tracks performance of the processor chip, metadata reflecting a state of the processor chip, wherein the diagnostic data is provided by the processor chip or by an operating-system or application thread running on the processor chip; and
  refining one or more of the plurality of instruction threads based on analysis of the sequenced data stream.

17. The method of claim 16 wherein receiving from the computer system comprises receiving from a sideband interface of the diagnostic logic via a shared input-output interface of the computer system.

18. The method of claim 17 wherein the computer system is a first computer system, the sequenced data stream being received in a cache-trace analysis software tool of a second computer system, the sideband interface supporting the cache-trace analysis software tool by relating the observed operations to corresponding code regions of the plurality of instruction threads.

* * * * *